United States Patent [19]

Murphy et al.

[11] Patent Number: 4,672,377
[45] Date of Patent: Jun. 9, 1987

[54] CHECK AUTHORIZATION SYSTEM

[76] Inventors: Arthur J. Murphy, 18337 Superior St., Northridge, Calif. 91324; Joseph F. Stratton, 1465 E. Putnom Ave., Old Greenwich, Conn. 06870

[21] Appl. No.: 774,216

[22] Filed: Sep. 9, 1985

[51] Int. Cl.⁴ .................. G06F 7/04; G06F 15/20
[52] U.S. Cl. ..................... 340/825.34; 235/375
[58] Field of Search ............ 340/825.33, 825.34; 235/375, 379, 380, 449, 470, 462; 364/401, 405, 406

[56] References Cited

U.S. PATENT DOCUMENTS

| | | | |
|---|---|---|---|
| 3,212,062 | 10/1965 | Goldman | 340/825.33 |
| 3,307,147 | 2/1967 | Goldman et al. | 340/825.33 |
| 3,345,612 | 10/1967 | Goldman | 364/900 |
| 3,727,186 | 4/1973 | Stephenson, Jr. et al. | 340/825.33 |
| 4,027,142 | 5/1977 | Paup et al. | 235/379 |
| 4,187,498 | 2/1980 | Greekmore | 340/825.33 |
| 4,264,808 | 4/1981 | Owens et al. | 364/406 |
| 4,404,649 | 9/1983 | Nunley et al. | 235/375 |
| 4,417,136 | 11/1983 | Rushby et al. | 235/375 |

Primary Examiner—Donald J. Yusko
Attorney, Agent, or Firm—Singer & Singer

[57] ABSTRACT

A check authorization and verification system for use by stores handling personal checks. A data base containing credit reference on all customers made accessible to the store and is accessed whenever the customer presents a card having a unique identifying number and a special personalized identification number known only to the customer. This procedure uniquely identifies the data base information with the person carrying the card. The system then establishes a unique number, usually in the form of a UPC code, that is immediately assigned to the customer. This code is imprinted on the customer's check, thereby uniquely identifying the check with the data base information of that customer. Scanning equipment at the checkout counter scans the check and the purchases, thereby obtaining immediate information concerning the credit status of the customer. The approved check is processed with MICR information thereby completely processing the check for use by the associated banking establishments.

17 Claims, 4 Drawing Figures

CHECK AUTHORIZATION SYSTEM

This invention relates to a check authorization system and more particularly to a system for use in those business establishments where payment is usually made by check and where customers demand a check cashing service.

In the art as practiced today it is well known that the modern day supermarket has evolved from a mere grocery store to a major department store selling a variety of goods and where payment is usually made by check.

Since the modern supermarket deals with fundamental products such as food, clothing and household accessories, it has become apparent that the average householder spends a large portion of his daily income at the supermarket and that payment is usually made in the form of a check, whether it be a business paycheck or a personal check in the name of the consumer.

In the typical supermarket operation the customer now requires what some people feel are banking facilities in that the consumer not only wants to pay by check for his purchases, but also requires that the supermarket cash his check for cash and in some situations demands the combination service of paying by check and getting some differential in cash as required by his individual needs.

The problem of the supermarket merchant in authorizing credit checks for the plurality of checks offered at the checkout stand is enormous because of the sheer volume of checks being handled without even considering the risks being taken by the supermarkets which includes approving checks that should not be honored and suffering the attendant loss, both in goodwill, money lost and goods lost.

In the art today there are many different systems that have been patented and offered to the merchants as a means of verifying customers and providing a service for establishing a check authorization system.

The most famous systems are the telephone verification system of R. N. Goldman et al., described in U.S. Pat. No. 3,307,147, which describes a telephone authorization system in which the store owner calls a service that has a complete listing of people, usually by driver's license or social security number, and in which a history of each of these persons is maintained as to their credit reference. The disclosed system allows the keeper of the data base to charge a fee for the service of providing information as to whether the customer has a good record and credit should be given or has a bad record and advises that no credit should be given.

Additional systems are disclosed in a patent by R. N. Goldman in U.S. Pat. No. 3,345,612 entitled Data Recovery System wherein the data file and inquiries are in a pre-arranged order. This system discloses an improvement in the data retrieval scheme of locating customers and represents a significant improvement in improving the time and speed in locating the information for use by the supermarket.

Another invention by R. N. Goldman in U.S. Pat. No. 3,212,062 entitled Check Authorization System describes still another scheme for improving the speed of transmitting the desired information from the data base to the merchant.

The aforesaid Goldman patents do represent breakthroughs in the art and represent the first serious attempt at providing the merchant with information regarding the verification and authorization information so that a decision could be made by the merchant as to whether the check should or should not be cashed.

Unfortunately in all of these prior art systems the data base is usually maintained by a separate entity, thereby making it impossible for the merchant to correlate the purchases made by the purchaser in order to establish a marketing research program of reviewing the purchases made by different consumers in different economic strata. These prior art systems provide only one answer and that is, should authorization be given to cash a check or not. If authorization is given, all contact between the customer and the storekeeper is lost and there is a hiatus between the records and the data base and the sale just consummated.

One of the more subtle problems associated with supermarkets cashing checks is the high volume of customers that demand a check cashing service of the supermarket and where no purchases are made and/or where only token purchases are made for the cashing of the check. This situation seems innocent enough on the surface until one realizes that the supermarket is actually performing a banking function without compensation to the supermarket.

At the present time there is a dichotomy between the major supermarkets and the banking institutions since the supermarkets are claiming that they are doing the banks a favor in allowing the customers to cash checks and that the supermarket is in effect processing a check for the bank and in so doing they claim the bank should pay the supermarket a fee for this service.

Banking institutions on the other side claim just the opposite since they feel that the supermarket cashes checks for customers as a convenience to their customer and not as a service to the bank and that cashing the check is the cost of doing business to provide additional services for customers to cause them to want to use a given supermarket and as such it is a cost of doing business that should be borne by the supermarket and not the bank.

The problem has both social and political overtones and regardless of how the problem is eventually solved, the overall problem of reducing the cost of processing checks, regardless of whether the bank pays or the supermarket pays, must be explored in depth in order to keep the cost of business at a minimum.

The busines climate of the supermarket has developed at the present time in such a direction that the customer demands the right to cash a check regardless of whether a purchase is made and, further, that the customer demands the right to pay for his purchases with a check and still have the right to ask for additional cash on top of his payment for goods purchased.

There are studies which indicate that in some of the major supermarkets that the total volume of dollars cashed by customers exceeds by almost 140% the actual dollar volume of goods sold by the supermarket. These figures would seem to indicate that the supermarkets are in fact in the banking business and that it is necessary to reduce the cost of processing the checks as well as being sure to have reliable and fast information concerning authorization information as to whether a check should or should not be cashed.

In an effort to control costs there are presently available to supermarkets systems in which a data base is maintained by an individual store as a result of the store requiring a credit history based upon a personal investigation of each individual customer. Those customers are identified either by social security or by driver's license number and an individual credit limit is assigned to each customer by management, which information is located in the data base.

The customer, when entering the store to make a purchase, first approaches a terminal where he inserts his personal identification card and check to be cashed and types in on a manual keyboard the amount of his check and his personal identification number which uniquely identifies him to the data base maintained by the store.

These present day systems can either maintain the data base in the store or by long lines and modums with a remote data base since present technology is fairly fast and accurate in obtaining the information required. Should the customer be approved, the answering information will be submitted to the terminal which will cause a man-readable printer to print in the amount on the check and a display terminal will indicate that the credit has been approved up to that limit and that the customer may now take his check which has been preapproved to the checkout stand for either cash or the payment of goods.

In these prior art systems delay at the checkout stand is minimized since the remote terminals obtain the credit information and provide the basis for supplying an approved check which the customer can now use either for cash or for the purchase as indicated above.

These prior art systems have been improved in that some supermarkets issue personal I.D. cards containing specific information uniquely identifying that person to the computer. The person manually inserts his personal identification number which thereby verifies that he is that person identified by the card and the process repeats itself as indicated above and that approval is indicated by printing the approved amount on the check.

Unfortunately once the check is approved the customer can now make purchases and pay for these purchases and obtain the difference in cash or go to the checkout stand and obtain the full amount in cash as he or she desires. It is important to note that there is no further tie in between the person in the data base and the check that has been pre-approved, nor is there any tie in between the goods purchased by the customer which could be used in marketing research studies to enable the store owner to determine patterns and buying habits of its customer.

It is also important to note that these prior art systems only supply authorization to cash a check and do not in any way expedite the processing of the check itself, nor do they reduce the cost of processing the check since each check must be individually handled by the store, returned to the bank, and then individually handled by the bank in accordance with the needs of each bank.

In the present invention there is described a system which processes each check and also provides authorization for the cashing of the check and in a manner that is at least as fast or faster than prior art systems.

Each check is uniquely identified by a machine-readable bar code number such as a Universal Product Code (UPC) number that is printed directly on the check and which then identifies the customer located in the data base and which is stored along with the customer information. This information then is identified at the checkout stand by a UPC scanner thereby allowing a review of the purchasing habits of each customer to be documented and recorded since it is now possible to correlate the customer with the purchases made by that customer through the UPC number that has been printed on the check and stored with the customer information.

This information is invaluable when used by marketing research personnel to determine the buying habits of people based upon their sex, their jobs, their income, and by any other basis that the researchers find desirous.

This kind of information is not available in the prior art systems simply because there is no way of tying in the actual purchases made by the customer to the person in the data base.

The present system also processes each check for the bank, thereby reducing the bank cost of processing the checks by automatically printing on each approved check the check amount in man-readable form and the coded bank MICR information in machine-readable coded form. In other words, once the check is approved, the UPC code is printed on the check, the MICR coded information is printed on the check, and the man-readable information printer prints the approved amount directly on the check, thereby indicating that the check has been approved and can be cashed at the checkout stand for the purchase of goods and/or cash.

The immediate advantages of the present system are that the approved check now contains all the information needed by the bank for automatically processing the check, which thereby reduces substantially the cost of handling the check by the bank. In addition, the UPC code provides a tie in between the information in the data base and the purchases made by the consumer.

In the broadest scope of the invention it is possible to use an I.D. card supplied by the store itself in combination with its own data base, whether it is located in the store or located remote from the store. An additional modification allows the customer to use a credit card should the store computer be on line with the credit card computer to either establish the credit viability of the customer or to allow a credit card purchase of the goods or cash at the checkout stand. Admittedly, this feature is not presently being used because of some legal requirements, however, the system is feasible and whether one uses an I.D. card for a store authorization computer or a credit card in combination with a credit card computer is really incidental to the disclosed sytem.

Last but not least is the fact that a bank debit card can be used, thereby allowing the store computer to go on line with the bank computer and, if properly authorized, to immediately debit the customer's account which establishes a cash transaction and removes all risk of authorization from the storekeeper.

The basic system allows a plurality of different card systems to be used limited only by the legal requirement of having the store computer communicate with the individual computer associated with the agency generating the card.

The inventive contribution is believed to reside in the fact that the UPC code is printed directly on the check when authorization is received and that the MICR printer and the man-readable printer immediately prints this information on the check at the time it is authorized, thereby immediately and without any further expense to either the bank or to the storekeeper, provides a check that is capable of being machine handled and disbursed without any further human interpretations.

Operation of this system depends on the fact that modern checkout stands use scanners capable of reading UPC codes on goods being purchased and that the same sensing devices are capable of reading the UPC code printed on the check. With this one caveat, cost to the supermarket can be substantially reduced and cost to the bank in processing pre-approved checks will also be substantially reduced while at the same time providing untold benefits to the supermarket in having marketing research information that has heretofore not been available to them.

It is an object of the present invention to provide a mechanism for approving the authorization of a check used by a customer and to provide a correlation by means of a UPC code printed on the check supplied by the customer between the purchases made by the customer and the customer himself.

It is a further object of this invention to provide a means for allowing the customer to use a debit bank card to directly withdraw funds from the customer's bank to pay the charges without the necessity of writing a check and still correlate the name, address and background of the customer with the list of actual purchases made by that customer.

It is still a further object of this invention to allow a customer to use any available credit card as a means of identifying the customer and provide the means for authorizing approval of the customer's check and/or to provide a direct means for allowing the customer to withdraw funds from the credit card account to pay for the store purchase and at the same time provide a correlation between the customer and the actual purchases made by that customer.

Still another object of this invention is to provide a means for the customer using a personal check for the store to preprocess that check by printing that amount on the check and the MICR information on the check and at the same time by means of a UPC code to provide correlation between that customer and the purchases made by that customer at the store.

It is still a further object of this invention to obtain interim approval for the cashing of a check prior to the time the customer presents himself at the checkout stand and without further delay to the customer in the event there is a delay in the transmission and computer time in obtaining initial approval.

The aforementioned objects of this invention are achieved by providing a kiosk at the store at which the customer submits his check for approval. The kiosk contains a check transport mechanism for aligning and receiving the check as well as a card reader for receiving either an I.D. card, a credit card or bank debit card. The kiosk also contains a manual data entry device that accepts alphanumeric information as inputed by the customer and a visual display to indicate to the customer what information has been inserted and what results have been obtained.

In the typical installation the customer inserts his check and passes his card through the card reader which then uniquely identifies him as the customer in question.

In accordance with conventional techniques the customer utilizing a manual data entry device inserts his private identification number (PIN) and if accepted by the computer the visual display will instruct the customer to insert the amount of his check. The customer at this point may insert a given amount or may insert an amount for the purchase plus some overage as dependent only upon the needs of the customer.

If we assume the customer inserts the amount of $300.00 as a fixed amount, the kiosk computer will transfer this amount to the store computer and depending on which the card the customer used, will contact via remote telephone lines the appropriate authorization computer.

On the other hand, should the customer use a credit card, then the kiosk computer in communicating with the store computer will communicate via telephone lines to the credit card computer and depending upon the association will obtain credit reference information.

Another variation may include the use by the customer of a bank debit card which is read by the card reader and reported through the kiosk computer to the store computer which in turn communicates via telephone line to the associated bank computer which then interrogates the client's account and if the amount is sufficient immediately debits the account, reporting back to the kiosk computer in the store.

Regardless of which credit card the client uses, the kiosk computer is notified that either the amount in question has been approved or disapproved, and if the amount is approved the associated information is displayed on the visual display so the client is immediately notified of the approval.

If the kiosk computer indicates that the client's credit is approved, then the kiosk computer will immediately cause the UPC printer associated with the kiosk to print a unique UPC code on the check which thereby uniquely identifies the check with the client's information in memory. The kiosk computer also causes a MICR printer to print MICR information on the check indicating the amount of the check that has been approved and, lastly, the kiosk computer causes a man-readable printer to print information on the check indicating the amount of the check. The check transport mechanism then ejects the check in such a manner that the customer retains the check which now has the UPC code imprinted on it, the MICR information imprinted on it, and man-readable information imprinted on the total amount approved.

At this point in time the customer may go directly to the checkout stand and ask for the full amount of the check in cash at which time the clerk at the checkout stand using standard scanning equipment reads the UPC code on the check which immediately communicates with the store computer to verify the information previously obtained and records this information in memory for later retrieval. If the check is valid and the UPC code is valid, the store computer will indicate this information to the checkout stand operator who will simply retain the check and pay the customer the cash disbursement.

On the other hand, should the customer make purchases and then return to the checkout stand with the list of purchases and the check, the checkout stand operator will then, using the scanner associated with the checkout stand, identify and record all the purchases made by the customer. At the time of payment the customer produces the check and the scanner simply reads the UPC number on the check and the store computer verifies this information and records the purchases and the check with the customer immediately indicating to the checkout stand the difference due the customer by way of cash or otherwise.

In a similar manner the credit card may be used either for simple verification and approval of the customer's check or a debiting of the customer's credit card account may be made depending on the arrangements between the store and the credit card agency.

The same is true if the customer is using a bank debit card since in that case an immediate debiting of the customer's account with the bank will be made, thereby in effect making the transaction a cash transaction since the money will be immediately transferred from the customer's account to the store's account. In that case any draft document will be acceptable since a check is not necessary in view of the immediate cash transaction.

It is envisioned within the framework of the present system that there may be times when a certain overloading of the telephone lines takes place and/or the store computer is overloaded to such an extent that a delay is occasioned in view of the time necessary to reach either the store authorization computer, the credit card computer or the bank computer.

In these cases the store computer after a suitable time delay which is kept to a minimum will immediately assign a UPC number to be printed on the customer's check even though complete authorization has not been received from the associated computer. Also printed on the check is the phrase "Approval Pending." The customer is aware of this delay and as far as the customer is concerned the bank will approve the check. The customer, after making a purchase or going directly to the checkout stand for cash, will find that at the checkout stand the operator will scan the UPC code and the store computer at that time will then transmit the information supplied by the associated authorization computer. If the computer has assigned a bad credit risk to that customer and credit is denied, that information will be communicated to the checkout stand by a suitable warning to the clerk and credit will be refused and the check not honored.

On the other hand, if subsequent information indicates that the check is valid and can be approved, that information will be indicated by the store computer to the checkout stand and the customer will be processed in the same fashion without any further delay in the processing of the check instrument.

The immediate advantages of the present system over the prior art is the elimination of any delay at the checkout stand as a result of obtaining credit authorization and approval for a check.

A second immediate advantage is the correlation that can take place between the customer in memory and the purchases made by that check through the use of the UPC code that is printed on the check. This information is invaluable for market research information and is not available in any other manner.

The system also provides the ability for bank debit operation or direct debiting of the credit cards if that system becomes available to the customer and/or operators.

Further objects and advantages of the present invention will become more apparent by referring now to the accompanying drawings wherein.

The present invention is predicated on the fact that financial information is maintained in a data base on a specific customer regarding his credit worthiness and bank balance.

In many stores this information is obtained by offering an application form to the customer who fills out the form indicating total income, expenses, and general background including family unit, economic status, etc., which the store credit people evaluate and assign a certain credit limit. This limit is recorded in memory with the client and the client is given a machine-readable card and a personal identification number (PIN) to uniquely identify that client so that the client's record can be examined only by the person having the card and PIN information.

The store issues a credit card having a magnetic stripe or other means of making the card machine-readable which the customer uses when purchases are made at that store. This technique is fairly basic and is in use by many stores today.

Still another technique for obtaining background information for a data base is the use of credit cards of which American Express, Visa and MasterCharge are probably the most famous. There are others but their techniques are all the same and may include the filing of an application by the customer giving all pertinent information from which a credit evaluation is made and a credit limit assigned to that customer. Here again a personal identification number is assigned and a number is given to that customer which, when used by that customer, uniquely identifies that customer whenever the file is to be debited or credited. The credit card may be used either for identification and credit reference or it may be used to actually debit the client's account when a purchase is made and without the necessity of writing a check.

Another technique coming into wide use is the use of a bank debit card issued by a bank to a customer of that bank and which is used by the customer to provide a means for accessing the customer's account and immediately withdrawing from the account a given amount of money as determined by the customer. The debit card is not a credit situation but rather is an immediate payment situation because money is immediately transferred from the customer's bank account to the store or other entity as authorized by the customer when using the bank debit card. This is one form of electronic funds transfer (EFTS).

At the present time the invention will be described primarily in connection with a supermarket that cashes checks and provides credit to its customers. The defined system may be used by any department store that cashes checks for customers and which provides a similar service.

The system is predicated upon the use of machine readable information in the form of sensors that read UPC codes printed on the goods and which is also capable of reading any other UPC code, whether it be on a voucher, check or coupon.

In the present invention the UPC code is printed on the check in question and in this way the store computer can correlate the purchases of the customer with the check tendered by the customer with the name and background of the customer which is in memory, whether it be in the bank computer, credit card computer or the store authorization computer.

As mentioned previously the present invention is more useful in connection with a supermarket and in which the main source of payment is by check or cash and not credit and in which the supermarket provides a service of check cashing for the customer and in an amount that is probably greater than the sales volume of the store itself. As indicated previously, most stores are reporting check cashing in an amount that is over 140% greater than the actual volume of goods as sold by the store.

The present invention contemplates a complete processing of a check for a given amount which includes the printing of the UPC code, the printing of the MICR code, and the printng of the man-readable code on the check, thereby obviating the need for the bank to reprocess this information, thereby reducing the cost of processing the check, both to the issuing bank and to the supermarket itself.

Figure 1:
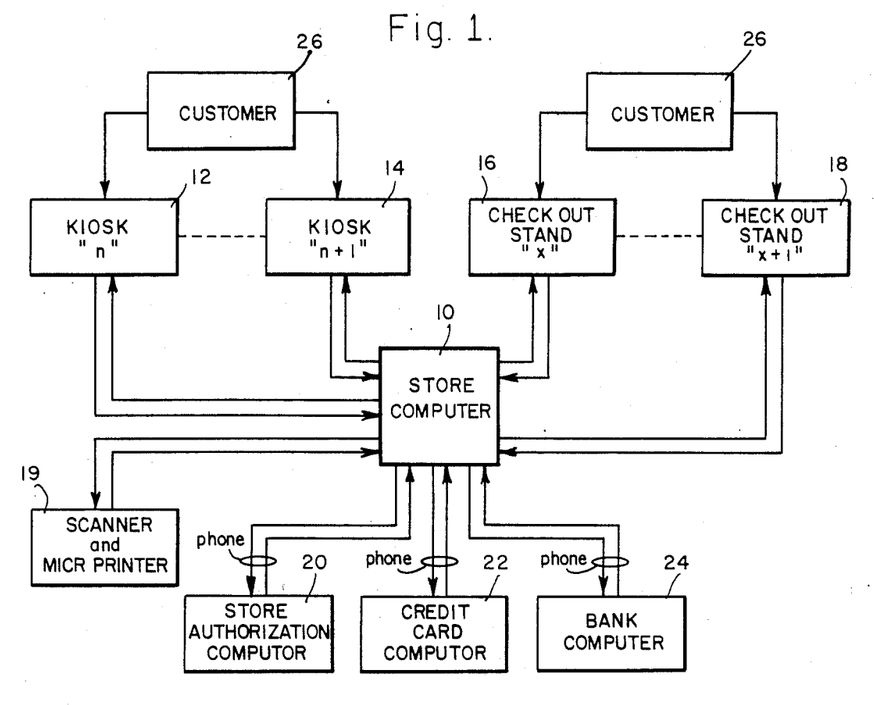
FIG. 1 is a block diagram illustrating a typical installation for a store having a plurality of kiosks and a plurality of checkout stands having bar code scanning equipment.

These objects and advantages of the present invention are made more apparent by referring now to FIG. 1 which illustrates a supermarket store having an in-house store computer 10 and a plurality of kiosks 12 and 14 and a plurality of checkout stands 16 and 18. The store computer 10 communicates by phone lines to a store authorization computer 20 or a credit card computer 22 or a bank computer 24.

In operation the customer 26 when entering the store will approach the kiosk 12 or 14, insert her check, and attempt to obtain approval. If approval is obtained the customer will either make a purchase or go directly to either checkout stand 16 or 18 to either pay for the goods purchased or to obtain cash for the check in question.

Associated with the store computer 10 is a scanner and MICR printer 19 that is used only by store personnel for those instances where the customer presents a check that is made out for the purchase plus some arbitrary amount of cash. In those situations the final amount of the check is not known at the time the customer 26 first approaches kiosks 12 or 14. It is only after the customer has made the purchases and then approaches the checkout stands 16 and 18 that the final bill is tabulated and the cash override is added to the check.

In those situations it is impossible for the kiosks 16 and 18 to print the MICR information on the check or to print the man-readable information on the check. For those situations the MICR information is not printed nor is the man-readable information printed, only the UPC code is printed on the check. The scanner and MICR printer 19 is utilized by the store personnel, usually at the end of the day, when all checks are sorted, tabulated and accumulated. Those checks made for an amount which has not been MICR printed are then passed through the scanner and MICR printer 19 which has the ability to scan and read the UPC code on the check, communicate this information to the store computer 10 which then correlates the code with the customer's check and determines from memory the amount of the check and automatically transfers this information to the scanner and MICR printer 19 which causes the MICR information to be printed on the check. In this fashion the system provides complete processing of all checks whether they are completed for a given amount as determined by the customer 26 when approaching the kiosks 12 and 14 or whether they are for the purchase plus an override at which point the store personnel automatically processes them before transmitting the checks to the bank. In either case the bank will receive a completely processed check containing MICR information and man-readable information which thereby allows the bank to automatically process the check without human intervention.

Figure 2:
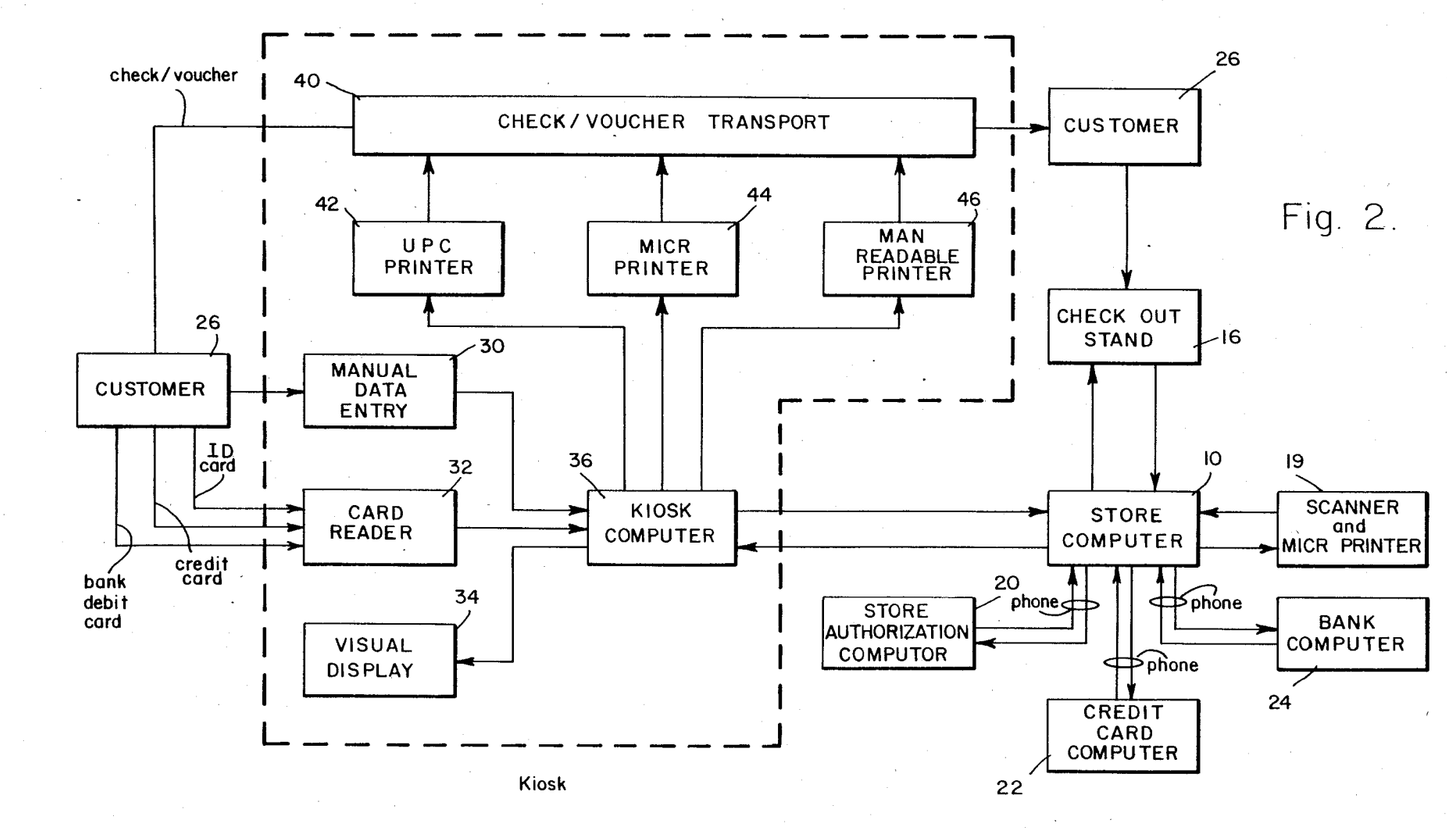
FIG. 2 is a block diagram illustrating the individual components of the kiosk and how they interact with the remaining components of the store for providing the defined functions.

Referring now to FIG. 2, there is shown a more detailed block diagram illustrating the operation of the kiosk 12 or 14 and how the kiosk interacts with the store computer 10.

The kiosk 12 or 14 illustrated in FIG. 2 contains a manual data entry 30 which in essence is an alphanumeric keyboard allowing the customer 26 to print in the PIN number and the amount of the check that is desired. The kiosk also includes a card reader 32 which is adapted to receive either an I.D. card, credit card, or a bank debit card used by the customer 26. A visual display 34 is part of the kiosk and will indicate to the customer 26 the information pertinent to the transaction such as whether approval has been obtained, the amount requested, and the status of the request. The heart of the kiosk is the kiosk computer 36 which receives inputs from the manual data entry 30 and the card reader entry 32 and is adapted to control the output of the visual display 34. The kiosk computer 36 communicates directly with the store computer 10.

In operation the customer 26 approaches the kiosk and inserts her check into a check voucher transport mechanism 40 associated with the kiosk. At the same time the customer 26 inputs the manual data entry with the PIN number which uniquely identifies her and the amount of the check that she wishes to be cashed. The customer then inserts either the I.D. card, the credit card or the bank debit card into the card reader 32 which reads the information encoded on the card, identifies the card, and feeds this information to the kiosk computer 36. The kiosk computer 36 in communicating with the store computer 10 immediately communicates through telephone lines with either the store authorization computer 20, the credit card computer 22 or the bank computer 24, depending on which card was used by the customer 26. Approval with a limit or a denial is determined by the appropriate computer. This information is relayed back to the store computer 10 back to the kiosk computer and, depending on whether credit is approved or disapproved, will display this information on the visual display 34 indicating to the customer the status of his request.

The kiosk computer 36 will then assign the UPC code to the customer 26 for that transaction and cause a UPC printer 42 to print this code on the check inserted within the check voucher transport 40. The kiosk computer 36 will then cause the check to advance through the transport 40 and cause the MICR information to be printed by a MICR printer 44 on the check. The kiosk computer will then advance the check through the transport 40 and cause a man-readable printer 46 to print man-readable information on the check before the check is passed through the transport 40 and returned to the customer 26.

At this point in time the check has been completely processed with a man-readable numerical amount printed on the check with MICR information printed on the check and with a UPC code printed on the check that uniquely correlates that transaction and customer with the customer information in memory.

In the event there is a delay with the store computer 10 communicating with either computers 20, 22 or 24, this information and the delay will be communicated to the kiosk computer 36 that will authorize pending approval information to be displayed on the visual display 34 and will also cause the UPC printer 42 to print and the man-readable printer 46 to print "Approval Pending." At this point in time the customer has the check with the UPC number printed and the words "Approval Pending" printed on it.

The customer knows that credit has not been approved and will continue through the store to make whatever purchase is necessary.

At this point in time the transaction between the store computer 10 and computers 20, 22 and 24 will have been completed and the approval or denial information will be stored in memory in the store computer 10. The information is correlated through the UPC code and if credit has been approved the store computer will have this information and, similarly, if credit has been disapproved the store computer will have this information and it will be correlated through the UPC code printed on the check and credit will be refused at the checkout stand.

At the time the customer 26 presents the check at the checkout stand 16 the checkout operator will use the scanner 52 (FIG. 3) to read the UPC code, thereby allowing the store computer 10 to correlate the UPC code with the information it has obtained from either of the computers 20, 22 or 24. If the stored information indicates disapproval, then the check is not honored and this is indicated by a suitable means. If credit is honored, then the transaction is continued with no delay to either the customer or to the checkout operator.

The transaction is now completed and the supermarket has completed the purchase record and is able to uniquely identify the customer with the items purchased and the check paid through the assigned UPC code. This information can be correlated at some later convenient time and the marketing research information can be used to determine sales information, customer buying habits, and other necessary information to the modern store operator.

At the same time the check has been completely processed in that it now contains man-readable information and MICR information which allows the supermarket operator to transmit the check directly to the bank without any further human processing being necessary by either the bank or the supermarket.

It is envisioned that this processing of the check will reduce the cost of processing by the bank which will have an ultimate savings to the supermarket in bank operation costs and overall costs of operation.

Should the customer use a credit card for credit information only, then the operation will be the same, only in this case the store computer 10 will communicate only with the credit card computer 22.

In the event the customer uses a bank debit card, then of course a check is not necessary and any document can be inserted into the check transport 40 associated with each of the kiosks. The same information will be printed on the voucher document such as the UPC code, and the man-readable information to indicate the amount debited from the customer's bank account through use of the bank computer 24. In any event, the customer has a complete record of what has been debited from his bank account and in effect a cash transaction has been initiated and satisfied.

All of the previous situations have been described in connection with a customer requesting a check cashing of a given amount which was determined at the time of the request for authorization. There are many situations where the customer simply wishes to pay for the purchase by check plus an arbitrary amount of say $25 in cash.

When the customer 26 approaches the kiosk, this information will be inputed into the manual data entry 30 by the customer who will push the associated equipment buttons to indicate payment plus $20 or payment plus $30 or payment plus $40 or whatever the limit the store will allow above the cost of the goods in question. Assuming the store policy is to allow no more than $50, the customer then pushes the button indicating payment plus $50 and this information will be communicated to the kiosk computer 36 and processed in the same fashion as before. Depending on the card used and the credit of the customer, the information will be communicated again to the kiosk computer 36 and indicated in the visual display as approved or not approved.

If approval is obtained, the customer places his check in the check transport 40 associated with each of the kiosks and the kiosk computer 36 will again cause the UPC printer 42 to print the UPC number on the check. At this point in time the amount of the check is unknown and hence the MICR printer 44 will be inhibited and the man-readable printer 46 will be inhibited since the amount is not given or known.

Figure 3:
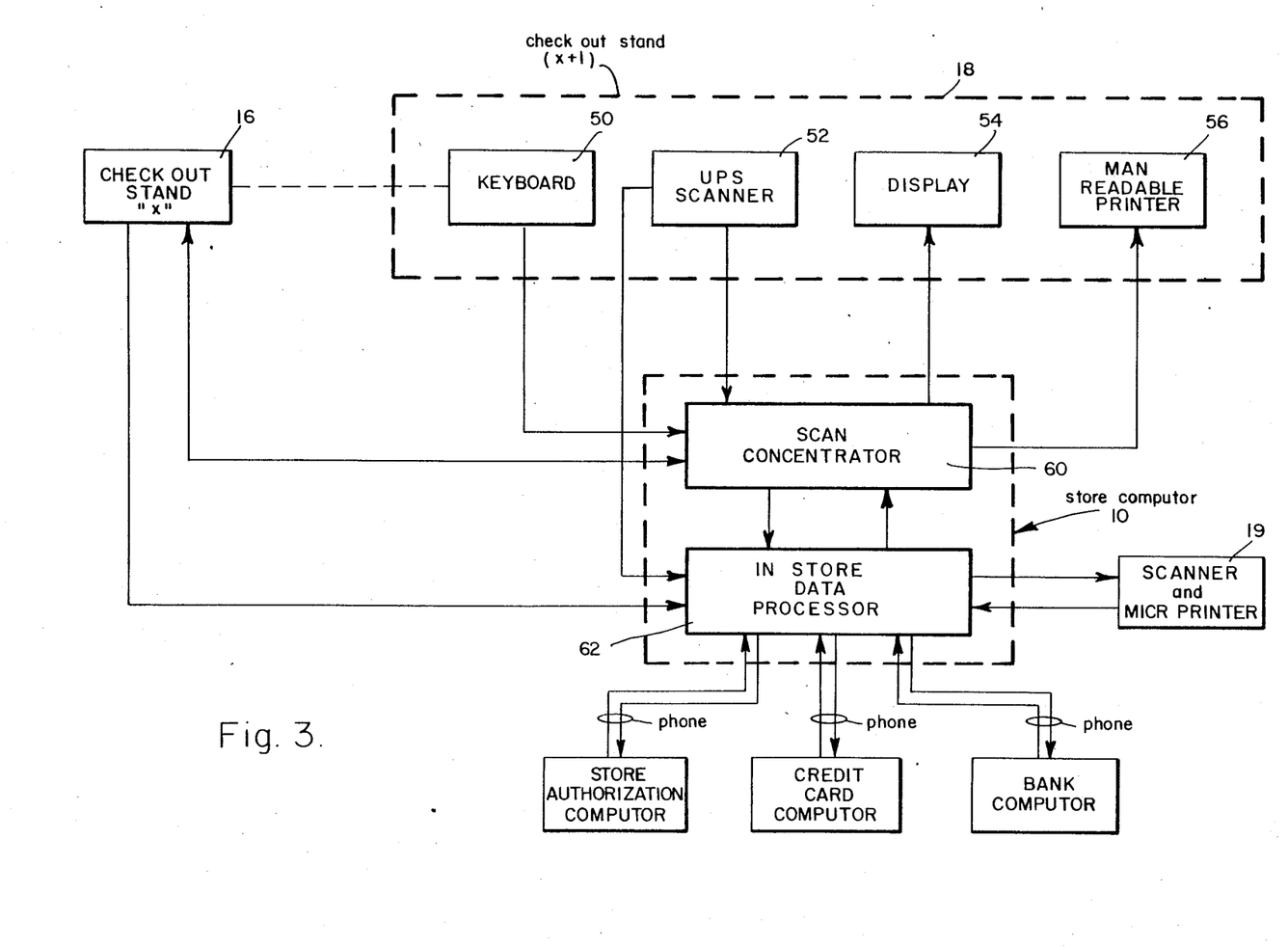
FIG. 3 is a block diagram illustrating in detail components of the checkout stand and how they cooperate with the remaining components of the system.

The check will be returned to the customer 26 and as before the customer will make purchases and eventually return the check to the checkout stand 16 where the operator will scan the goods in question to obtain a list of purchases and then scan the check and record the UPC number which is communicated with the store computer 10. Since an upper limit of credit has already been obtained or is in the process of being obtained, the process is the same as before and in this case a printer associated with checkout stand 16 may print in the amount and the transaction completed at the checkout stand 16 or the customer will fill in the amount. The operator will accept the check and pay the customer the $25 or $50 in cash that was originally requested over the amount of the purchase.

For those situations where the full amount of the check is not known until the final purchase at the checkout stand 16, and the amount is not printed at the checkout stand, the store employee now has a customer's check with a handwritten amount of the total payment, together with a UPC code that was originally printed by the kiosk 12 or 14.

At the end of the day a store employee will take all of those checks that are not complete and pass them through a scanner and MICR printer 19 which is more fully illustrated and described in connection with FIG. 4. In essence, scanner and MICR printer 19 contains a scanner for reading the UPC code, which information is communicated to the store computer 10 that correlates the check document with the transaction made and sends this information back to the scanner and MICR printer 19 where the MICR information is printed on the check.

Referring now to FIG. 3, there is shown details of the checkout stand to indicate how the checkout stand operator will process the goods in question and the check by means of the sensor associated with the checkout stand.

FIG. 3 illustrates a plurality of checkout stands 16 and 18. Each of the checkout stands are the same and checkout stand 18 is illustrated as having a keyboard 50 for allowing the operator to key in information that is not machine-readable.

Checkout stand 18 also includes a scanner 52 capable of reading UPC codes, a display means 54 such as an LED or other suitable readout device, and a man-readable printer 56 capable of printing a man-readable tape indicating the full purchases made by the customer together with the amount tendered and the amount paid out in cash.

The store computer 10 includes a scan concentrator 60 and an in-store data processor 62. The scan concentrator 60 communicates with the keyboard 50, the scanner 52, the display 54 and the man-readable printer 56. The scanner 52 feeds information both to the scan concentrator 60 and the in-store data processor 62 thereby allowing scanned information read by the scanner 52 to be inputed into the in-store data processor for use with the total inventory control system associated with the store and to also correlate the individual purchases purchased by the specific customer that the UPC number assigned to that customer by the in-store data processor 62.

The customer in presenting herself to the checkout stand 18 will have all of the individual scannable goods scanned by scanner 52 and will observe each purchase being displayed by means of display 54. The checkout stand operator using keyboard 50 will input those items not having machine-readable information. The man-readable printer 56 will indicate the individual purchases and the total purchases and the amount paid and/or tendered by the customer.

Each checkout stand communicates with the scan concentrator 60 and the in-store data processor 62 and in this way the scanner 52 associated with each checkout stand reads the UPC code that has been assigned to the individual customer's check or voucher and which is printed on the check or voucher in question and retains this information in the in-store data processor for retrieval at a later time for use by market research analysis personnel.

Upon completion of the transaction, if the amount has not been completed at the kiosk, the customer prints in the full amount which is the total of the purchases plus $50 or whatever other amount was requested and gives the check to the checkout stand operator who pays the customer the cash amount requested of $50.

At this point in time the check in question has not been completely processed since the full amount is not known until after the final purchase has been consummated.

Figure 4:
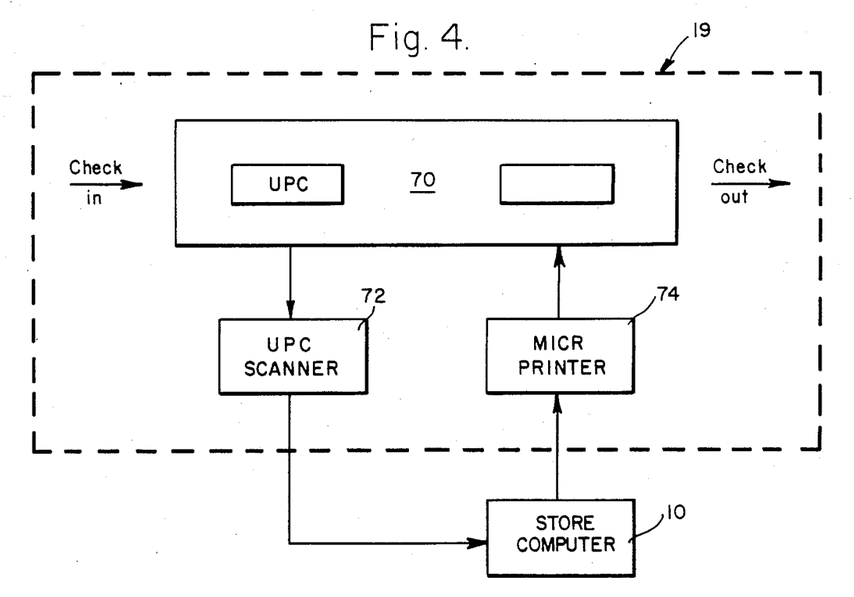
FIG. 4 is a block diagram of a scanner and MICR printer used only by store personnel.

Referring now to FIG. 4, there is illustrated a scanner and MICR printer 19.

At some later time, preferably in the evening, the individual checks that have been received for payment of goods plus a cash amount are then individually processed through the scanner and MICR printer 19.

The scanner and MICR printer 19 includes a check transport 70, a UPC scanner 72, and a MICR printer 74. The store computer 10 receives input from the UPC scanner 72 which detects the UPC code on the check passing through the transport 70. The UPC scanned information is communicated with the store computer 10 and a correlation made between the customer making the purchase and the UPC number. The purchase information is then fed to the MICR printer 74 to print this information on the check.

At this point in time the checks are all individually processed and in a manner faster than can be done by individually hand-keying the information as is now done by bank personnel.

It is quite apparent that printing the UPC code on the check in association with sensor equipment presently being used that can machine-read this information, that it is now possible to obtain correlation between the purchases made by the customer and in this way provide marketing research information that is not otherwise available.

The savings to the bank and to the supermarkets by preprocessing the check at the time the check is authorized not only saves time for the customer but also money for the associations in processing the documents in question.

We claim:

1. A system for verifying and authorizing payment of a voucher comprising:
    a card having a unique number for identifying and locating stored credit reference information,
    a data entry device for entering a personal identification number that uniquely identifies a customer presenting said card,
    a computer for correlating said unique number on said card with said personal identification number for accessing said stored credit reference information and approving payment of a voucher by assigning a unique bar code for said voucher presented by said customer,
    a bar code printer controlled by said computer for printing said code in machine-readable form on said voucher presented by said customer, and
    a checkout stand having a bar code reading scanner for reading said code on said voucher and feeding said information to said computer for verifying approval of payment of said voucher.

2. A system according to claim 1 which includes a MICR printer controlled by said computer for printing MICR coded information on said voucher.

3. A system according to claim 1 in which said bar code is a UPC code.

4. A system according to claim 1 in which said card is machine-readable.

5. A system according to claim 1 which includes a man-readable printer controlled by said computer for printing man-readable information on said voucher.

6. A system according to claim 1 in which said card consists of a bank debit card, and in which said computer communicates with a remote bank computer to determine the status of the bank account of said customer, and in which said voucher contains the bar code printed by said code printer, and a man-readable record printed by said man-readable printer thereby giving the customer a complete record of the transfer of funds from his bank account as evidenced by said voucher.

7. A system for verifying and authorizing payment of a draft having a fixed amount comprising:
    a card having unique number for identifying and locating stored credit reference information,
    a data entry device for entering a personal identification number that uniquely identifies a customer presenting said card,
    a computer for correlating said unique number on said card with said personal identification number for accessing said stored credit reference information and approving payment of the draft by assigning a unique bar code for said draft presented by said customer,
    a UPC printer controlled by said computer for printing said UPC code in machine-readable form on said draft presented by said customer, a MICR printer controlled by said computer for printing MICR coded information on said draft, and a checkout stand having a UPC code reading scanner for reading said UPC code on said draft and feeding said information to said computer for verifying approval of payment of said draft.

8. A system according to claim 7 which includes a man-readable printer controlled by said computer for printing man-readable information on said information.

9. A system according to claim 7 in which said MICR printer prints MICR coded information on said draft indicating the exact amount requested for said draft, and which includes a man-readable printer for printing man-readable information indicating the exact amount presented on said check draft.

10. A system according to claim 7 in which said card consists of a bank credit card, and in which said computer communicates with a remote bank credit card computer to determine the status of the credit of said customer.

11. A system for processing a check comprising:

means for establishing and accessing a data base in a remote computer containing background and credit information for all potential customers, means for uniquely identifying a customer with the information contained in the data base of said remote computer, means for customer requesting and establishing a transaction limit, means for assigning a unique machine-readable bar code to said customer and storing said code with said customer information, means for determining a credit limit offered to said customer and storing said information, means for printing said stored bar code on a customer prefered check in machine-readable form, and means for machine-reading said bar code on said check for correlating said bar code with said stored bar code as contained in said remote computer for releasing said credit limit information, and means for comparing said credit limit information with the amount of credit requested by said customer for verifying that the requested transaction is within said approved credit limit.

12. A system according to claim 11 which includes a man-readable printer controlled by said computer for printing man-readable information on said check.

13. A system for processing a check according to claim 11 which includes:

a check transport mechanism for receiving checks having imprinted bar code information, a bar code scanner for reading imprinted bar code information on said check and adapted to feed bar code scanned information to a remote computer, and a MICR printer adapted to be controlled by said remote computer for printing MICR coded information on said check.

14. A system for verifying and authorizing payment of a voucher comprising:

means for uniquely identifying a customer to a computer having stored credit reference information in memory, means for accessing said computer and requesting a transaction amount limit, means in said computer for correlating the requested transaction amount limit with the credit reference information on file and assigning a unique bar code for each request that is approved, means controlled by said computer for printing said bar code on a voucher proffered by the customer if approved, and means controlled by said computer for printing MICR coded information on the voucher corresponding to the requested transaction amount limit requested and approved.

15. A system for verifying and authorizing payment of a voucher according to claim 14 which includes:

a checkout stand having a bar code reader scanner for reading said code on said voucher and feeding said information to said computer, means at said checkout stand for determining the exact transaction amount and feeding said amount to said computer, and in which said computer controls the printing of MICR coded information corresponding to the exact transaction amount in said computer.

16. A method for verifying and authorizing payment of a voucher comprising the steps of:

uniquely identifying the customer to a computer having stored credit reference information in memory, accessing the computer and requesting a transaction amount limit, correlating the requested transaction amount limit with the credit reference information on file and assigning a unique bar code for each request that is approved, printing the bar code on the voucher proffered by the customer if the request is approved, and printing MICR coded information on the voucher corresponding to the requested transaction amount limit requested and approved.

17. A method for verifying and authorizing payment of a voucher according to claim 16 which includes the steps of:

detecting the bar code on the voucher proffered by a customer at a checkout stand and feeding this information to the computer, determining the exact value for the voucher preffered by the customer at the checkout stand and feeding this information to the computer, and printing MICR coded information on the voucher corresponding to the exact amount of the customer's transaction directly from the computer.

* * * * *